Dec. 5, 1967 T. DEIGHTON 3,356,583
LIQUID MODERATED NUCLEAR REACTOR
Filed Dec. 10, 1964
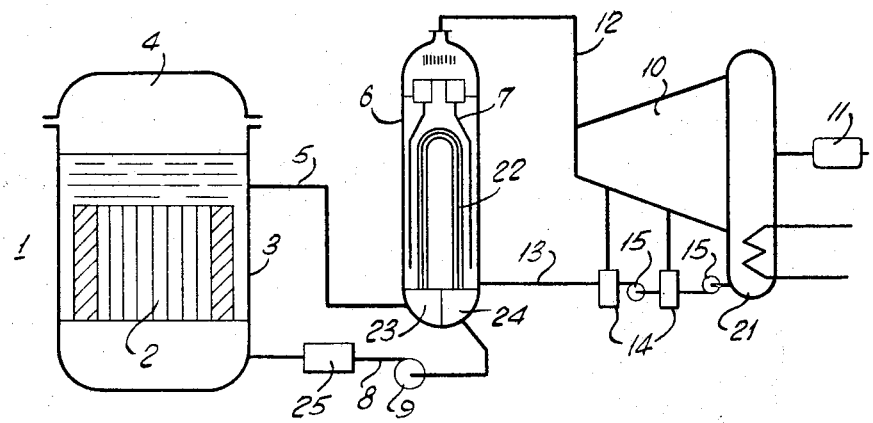
INVENTOR
THOMAS DEIGHTON
BY
J. P. Moran
ATTORNEY

3,356,583
LIQUID MODERATED NUCLEAR REACTOR
Thomas Deighton, Galveston, Tex., assignor to Babcock & Wilcox, Limited, London, England, a corporation of Great Britain
Filed Dec. 10, 1964, Ser. No. 417,316
4 Claims. (Cl. 176—64)

This invention relates to liquid moderated heterogeneous nuclear reactors and is more particularly concerned with improved methods of operating reactors and improved reactors in which relatively large reactivity changes are available, which may be regulated other than by the sole use of control rods which perturb the flux, lower the utilization of the fissile material and are complex and expensive pieces of machinery.

A method of operating a liquid moderated heterogeneous nuclear reactor according to the present invention includes providing a core comprising fissile material and a moderating liquid at a pressure within a range which is close to but below the critical pressure of the liquid and in which range the rate of change of saturated liquid density with pressure is relatively high, which core is critical when the pressure has a higher value in the said range and the core is under simmering conditions, and when some fissile material has been consumed by fission thereof reducing the pressure to increase the density and the neutron slowing down power of the liquid so that the fissile material in the core is still sufficient to provide core criticality.

The invention also includes a heterogeneous nuclear reactor adapted to operate under simmering conditions having a core comprising a liquid moderator and fissile material adapted to attain criticality when the pressure of the moderator lies within a range which is close to but below the critical pressure of the liquid and in which range the rate of change of saturated liquid density with pressure is relatively high and means adapted by control of pressure within the said range to regulate the reactivity of the core.

The various features which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

The invention will now be described by way of example with reference to the accompanying schematic drawing of a power plant energized by a water moderated heterogeneous nuclear reactor.

Referring to the drawing, a light-water cooled, light-water moderated heterogeneous nuclear reactor 1 comprises a core 2 arranged within a pressure vessel 3 which contains light water covering the core and, in an upper part 4 of the pressure vessel, steam in contact with the water. The core is of the kind formed by a plurality of vertically extending fuel elements disposed side by side in an array of roughly circular cross-section, each fuel element providing a channel for the upward flow of water therethrough over the surfaces of closely arranged vertically extending pins therein of which each provides fissile and fertile material enclosed by protective sheathing.

A conduit 5 is provided for the withdrawal from the pressure vessel of water which, after having been heated by upward flow in contact with the fuel element pins, leaves the upper end of the core and the said conduit leads to a second pressure vessel 6 containing a steam generator 7. A further conduit 8, in which is arranged a water pump 9, is provided for leading the water, after passage through the steam generator, back to the reactor pressure vessel 3 for re-entry at the lower end of the core to the fuel elements.

The steam generator may be of any suitable construction adapted for the generation of steam from water in a secondary circuit which includes a condensing steam turbine 10 connected to drive an electric alternator 11, a steam conduit 12 leading from the steam generator to the turbine and a water conduit 13 leading from the turbine condenser 21 to the steam generator 7, and having therein a series of feed heating heat exchangers 14, receiving bled steam from the turbine, and water pumps 15. As schematically indicated, the water of the secondary circuit is heated and evaporated in the steam generator by receiving heat from a multiplicity of tube loops 22 in which the reactor cooling water flows, the tube loops being arranged in inverted U-shape within the steam generator pressure vessel 6 and extending therein from a reactor cooling water inlet chamber 23 to a reactor cooling water outlet chamber 24.

The reactor is designed to be critical when operating with new fuel elements under simmering conditions at a subcritical water pressure of 3,200 p.s.i. or thereabouts. At such pressure water leaving the core on the point of boiling has a density of about 20 pounds per cubic foot. The volume ratio of metal to water is sufficiently large that the core is undermoderated, that is to say, therefore, that, if the average water density and thus the average macroscopic neutron slowing down power in the core of the water moderator were to be increased, the core reactivity would be raised owing to the increase in resonance escape probability and the reduction in leakage outweighing, in their combined effect on the effective multiplication factor, the reduction in thermal utilization.

Conventional means (not shown) for controlling the reactor may be provided including preferably not more than one control rod of the neutron-absorbing type, preferably of the so-called "gray" type which is capable of absorbing neutrons of the different speeds at which they are present in the core and which will not unduly perturb the neutron flux in the core. It will be understood that reactivity may be increased or decreased by moving the control rod respectively out of or into the core. Means (not shown) are provided for adding water to or subtracting water from the moderator-coolant water circuit, whereby for instance to increase or reduce the aqueous fluid content of the circuit.

In operation of the plant, the moderator-coolant water is circulated by the pump 9 through the reactor core 2 to remove the heat generated therein and through the tube loops 22 of the steam generator 7 in which moderator-coolant water is cooled in generating steam to drive the turbine 10. Bubbles formed in the water under the simmering conditions in the core rise into the steam space 4 in the upper part of the reactor pressure vessel 3.

Core power perturbations under simmering conditions tend to be damped since a core power increase or decrease causes a pressure rise or fall which corresponds to a lower or higher density of staturated water, i.e. water on the point of boiling and thus a reduction or an increase in reactivity. An increase in power demand by the alternator is effective through the turbine and the steam generator to cause an increase in the heat absorption from the moderator-coolant water in the tube loops in the steam generator which causes an increase in the average water density in the core and thus an increase in reactivity as is desired upon a rise in power demand. The increase in reactivity increases steam generation and causes an increasing pressure during which the density of saturated water falls until just critical conditions are restored at a higher power level. Similiarly but reversely, a reduction in alternator power demand causes a core power level fall. The reactor is operated at high pressures below the critical pressure in a pressure range in which the saturated water density changes greatly with pressure.

The core undermoderation suppresses an excess reactivity of the core. As, during operation, by reason of the consumption of fissile material by fission thereof and by reason of the build-up of fission product poisons, the excess reactivity to be suppressed falls, the core requires for criticality a higher average water density therein and the pressure which prevails in the moderator-coolant water in the circuit thereof falls.

At a pressure of 2,800 p.s.i. water leaving the core on the point of boiling has a density of about 31 pounds per cubic foot instead of the density of about 20 pounds per cubic foot the water on the point of boiling has at 3,200 p.s.i. and thus if operation is effected over the range between said pressures a very large change in saturated water density is available for accommodating power changes and compensating for fuel burn-up and poison build-up. It has been calculated that such mentioned change of water density in a small reactor is capable of changing the reactivity by about 10%.

During initial starting-up or before a lengthy shutting down involving cooling and depressurization of the reactor, excessive reactivity at lower water temperatures or due to a density rise in the moderator-coolant water upon cooling that cannot be controlled by the control rod may be avoided by the addition of soluble poisons, for example, boric acid to the water.

During routine shutdowns and startups the reactor temperature is maintained high by means of suitable heating means of the moderator coolant water, for example, in the water conduit 8 behind the pump 9 as indicated at 25, in order to avoid high water densities that might preclude subcriticality.

In order, if desired, to hold down higher initial excess reactivities and to increase the range of control, the moderator coolant water may be a mixture of light and heavy water of which the proportions are changed according to the known methods of spectral shift. Alternatively or in addition the reactivity of the core may also be controlled by soluble poisons which are removed in suitable manner as fuel is consumed and as fission product poisons increase or may be controlled by burnable poisons.

In a modification, the steam generator may be accommodated within the same pressure vessel as the reactor core and this arrangement may be more particularly suitable for marine or other small reactors.

The steam generator of the power plant may be modified for steam superheating as well as steam generating and may supply steam at a pressure of 700 p.s.i. and a superheat temperature of 680° F. to a turbine.

In the case of a reactor for marine purposes it is advantageous to design the reactor so that while the volume ratio of metal to water is sufficiently large that the core is undermoderated when operating under simmering conditions with water within the pressure range of 2,800 p.s.i. or thereabouts to 3,200 p.s.i or thereabouts the volume ratio is yet sufficiently small that, with water in the core at temperatures normally found in seas and oceans, the core is subcritical so that the reactor would shut down in the event of an accident involving the replacing of the moderator coolant water in the core by cold seawater.

Furthermore, in the just subcritical condition water has a large change of density with a change in temperature as well as a high thermal capacity. Thus the coolant flow rate for a given power is reduced compared to the flow rate in a conventional pressurized water reactor and the natural circulation driving head is increased for the same differential temperature across the core. This is particularly desirable in a compact or marine type integral reactor since it permits the plant to operate over its full power range by natural coolant circulation and the main primary circulating pumps may be eliminated reducing the capital cost of the system.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A method of operating a pressurized water-moderated heterogeneous reactor having a core provided with a plurality of fissile material-bearing fuel elements arranged in a fixed lattice and a plurality of fixed regular flow channels therethrough, said core being arranged to attain criticality under predetermined conditions of moderated water, said method comprising the steps of supplying moderating water to said core at a pressure within the range of 2800 to 3200 p.s.i., directing moderating water through the core to increase its temperature only to the extent that core moderating water outflow is at or close to the saturated liquid temperature corresponding to its pressure and so that the moderating water will be substantially free of stagnant vapor in passing over the fuel elements, maintaining the level of the moderating water in the reactor above the core, while maintaining the pressure of the moderating water within the range of 2800 p.s.i. to 3200 p.s.i., which range includes the predetermined conditions under which criticality of the core is attained, maintaining a body of steam in contact with the moderating water covering said core, circulating the moderating water in said core through a heat exchanger disposed outside of the reactor, circulating a secondary fluid through the heat exchanger, extracting heat from said secondary fluid in a prime mover that is connected to a loading device, and varying the pressure of the moderating water in said core within said range by varying the load on said prime mover, a change in load causing a change in the pressure and a relatively large change in the density of the moderating water in the core and of the reactivity of the core.

2. A method as claimed in claim 1, including varying the reactivity of the core by introducing and withdrawing burnable poisons from said liquid.

3. The invention according to claim 1 including the further step of maintaining criticality in the core upon consummation of a portion of the fissile material by allowing a decrease in pressure of the moderating liquid.

4. A method as claimed in claim 1 in which the moderating liquid is a mixture of light and heavy water.

References Cited

UNITED STATES PATENTS

| | | | |
|---|---|---|---|
| 2,989,453 | 6/1961 | Esselman et al. | 176—20 |
| 2,989,454 | 6/1961 | Breden et al. | 176—20 X |
| 2,990,349 | 6/1961 | Roman | 176—20 X |
| 3,042,600 | 7/1962 | Brooks | 176—20 |
| 3,153,617 | 10/1964 | DeFelice | 176—20 |
| 3,226,300 | 12/1965 | Zmola et al. | 176—61X |

OTHER REFERENCES

Nucleonics, December 1955, pp. 42, 43, 44 and 45.

REUBEN EPSTEIN, *Primary Examiner.*